United States Patent Office 3,799,740
Patented Mar. 26, 1974

3,799,740
CLINICAL COMPETITIVE-BINDING TEST METHODS
Everett K. Mincey, Chesterfield, Mo., assignor to Mallinckrodt Chemical Works, St. Louis, Mo.
No Drawing. Filed July 12, 1971, Ser. No. 161,882
Int. Cl. A61k 27/04; G01n 33/16
U.S. Cl. 23—230 B                                    6 Claims

ABSTRACT OF THE DISCLOSURE

An improvement in thyroid function testing provides a direct determination of the Effective Thyroxine Ratio which is a free thyroxine index. Unsaturated thyroxine-binding globulin (TBG) contained in a aliquot of the patient serum is used to compensate for distortions ordinarily introduced by elevated estrogen levels, etc. The principle is applicable to other competitive-binding methods.

BACKGROUND OF THE INVENTION

(1) Field of the invention

This invention relates to the field of clinical chemistry and more particularly to in vitro test methods utilizing radioisotopes.

(2) Description of prior art

Valuable reviews of the art in this field, with extensive references to the original journal literature may be found in Section 1—"Protein-binding Studies and Radioassays" of Radioisotopes in Medicine, R. L. Hayes, F. A. Goswitz and B. E. P. Murphy, Editors, CONF 671111, U.S. Atomic Energy Commission, 1968.

The thyroid gland concentrates inorganic iodide from the plasma and chemically binds it to the amino acid tyrosine, to form two hormones, 3,3',5'-triiodothyronine (T3) and 3,5,3',5' - tetraiodothyronine (thyroxine or T4), monoiodotyrosine and diiodotyrosine being formed as intermediates, which then couple to form T3 and T4. These hormones are secreted into the circulatory system where they may be taken up by peripheral tissues, affecting certain biochemical pathways, within the cells, that regulate cellular metabolism.

These hormone syntheses take place within the molecular structure of a glycoprotein referred to as thyroglobulin. Thyroglobulin contains 97 percent of the iodine found in the thyroid gland. It is held that proteolytic enzyme hydrolysis breaks down the thyroglobulin, allowing release of hormones, mainly thyroxine. Under normal thyroid conditions, thyroglobulin is not released into circulation (due to its large size) and remains a major component of the thyroid follicular colloid.

Analysis of the thyroglobulin protein shows it contains about 17–28% monoiodotyrosine, 25–42% diiodotyrosine, 5–8% triiodothyronine (T3), and 35% thyroxine (T4). Thus the thyroid gland synthesizes and stores approximately 4 times as much T4 as T3. If T3 is secreted from the thyroid in the same proportion as it is found in the thyroid, then it would theoretically account for about 20 percent of the organic iodine secreted. Therefore, if T3 behaved in a manner similar to that of T4 in the serum, one would expect to find about 1.8% of T3 in the serum. However, investigators have reported serum T3 levels of approximately 0.2 g. percent. The reason for this very low percentage lies in the difference in the affinity of certain proteins for binding T3 and T4.

Certain serum proteins bind these thyroid hormones in varying degrees. These proteins are globulin (thyroxine-binding globulin, TBG), prealbumin (thyroxine-binding prealubumin, TBPA) and albumin (serum albumin, SA). The one term, thyroxine-binding, encompasses the binding of both T3 and T4 to these proteins, since either T3 or T4 can be taken up by a given binding site. The thyroid hormones are in dynamic equilibria with the thyroxine-binding proteins. For example, the T4/TBG equilibrium may be represented as follows:

$$T4 + TBG \rightleftharpoons T4 \cdot TBG$$

An equilibrium (association) constant has been calculated for each such equilibrium.

Table 1 illustrates the percent distribution, capacity and association constants of these proteins for T3 and T4.

TABLE 1

| Serum protein | T3 | | T4 | | Binding capacity for T4 (μg T4/100 ml. of serum) |
|---|---|---|---|---|---|
| | Percent bound | Association constant, K | Percent bound | Association constant, K | |
| TBG | ~70 | 2×10⁹ | ~60 | 4×10¹⁰ | ~25 |
| TBPA | | | ~30 | 1×10⁹ | ~250 |
| SA | ~30 | 2.7×10⁵ | ~10 | 1.6×10⁶ | (¹) |

¹ Very large.

It should be pointed out that the above values are from in vitro studies and may not hold for in vivo conditions, although they should be indicative.

The lower binding or association constants for T3 indicate that less of this hormone will be bound by these proteins than will T4. Since it is probably the unbound or "free" hormone which is biologically active because it is readily available for assimilation by the tissues, T3 is more available to the tissues than T4. Since T3 is associated with the tissues, the actual amount found in the bloodstream as serum T3 is much lower than would be expected in comparison with T4 values.

The unbound or "free" T4 plasma level is estimated to be less than 0.1 percent of the total protein-bound T4, or approximately 2–5 millimicrogram percent. An estimated value of 1.5 millimicrogram percent has been given for a normal "free" T3 level.

The rate of thyroid hormone synthesis and secretion is influenced by another hormone, thyroid stimulating hormone (TSH), secreted by the anterior pituitary gland. TSH is believed to regulate the "trapping" or removal of iodide from plasma, iodination, coupling of idotyrosines, and release of the thyroid hormones by proteolysis of thyroglobulin. The level of circulating T3 and T4 influences the rate of secretion of TSH. When plasma levels of these hormones are below normal concentrations, the pituitary is stimulated to synthesize and secrete TSH. TSH stimulates thyroid hormone secretion, which in turn, by a negative feedback process, reduces pituitary TSH secretion.

The effects of thyroid hormones on various tissues of the body have undergone extensive study, but complete understanding of cellular-thyroid hormone interaction is still lacking. One of the important effects is that the rate of energy exchange and oxygen consumption of tissue is increased by thyroid hormones.

One should refer to a text on thyroid function to properly appreciate the complex role thyroid hormones play in the metabolic balance of the body.

Several commonly used in vivo and in vitro clinical tests assist the physician in evaluating thyroid function. Some of these are briefly discussed below.

The basic metabolic rate (BMR) measures the gross heat production (metabolism) of the body at total rest by determining oxygen consumption. Under optimum test conditions it is essentially an indication of the function of the thyroid gland.

As the role of iodine in thyroid function became known, measurement of protein-bound iodine (PBI) became the standard test of thyroid status. The PBI test measures the level of protein-bound iodine in the circulation. It attempts to measure the circulating T3 and T4, but is subject to error because of its lack of specificity.

A test of thyroid function that is extremely useful clinically is the T3 uptake test. The T3 uptake test measures the capacity of certain serum proteins, primarily TBG, to take up or bind radioactively labeled T3 by unsaturated or vacant thyroxine binding sites; hence, it is primarily a measurement of unfilled binding sites. The prototype of T3 uptake determinations was first developed in 1957 by M. W. Hamolsky and coworkers (J. Clin. Endocrinol. 10: 33). They attempted to estimate the degree of distribution of labeled T3 between serum components and red cells by determining the percentage of the total T3 that is bound to the red cells after incubation and washing.

In 1958, M. L. Mitchell (J. Clin. Endocrinol. 18: 1437–39) described the substitution of an anion exchange resin for the red cells as the secondary binding site in the T3 uptake test. The anion exchange resin has an affinity for iodides, thyroid hormones, and analogous compounds, and provides more durable binding sites for T3 than do the red cells.

In 1962, J. F. Scholer (J. Ncl. Med. 3: 41–46) reported on a different type of T3 uptake test (Thyro Binding Index, TBI). Instead of introducing labeled T3 to serum and determining the percentage of activity bound to the red cells or resin, he utilized granular resin prelabeled with radioactive T3. D. R. K. Murty et al. (U.S. Pat. No. 3,507,618/1970) utilized the same principle but with the exchange resin bonded to a backing sheet.

V. Herbert et al. in 1965 (J. Lab. & Clin. Med. 66: 814–821) introduced the use of treated charcoal as a variation to the concept of secondary binding in the T3 uptake test. The ion exchange resin of Mitchell's method is replaced with a protein-coated charcoal system. The molecular size and matrix of the protein coat is capable of adsorbing smaller molecules (T3), while molecules (TBG) similar to or greater in size than those of the protein coat are not absorbed.

Other variations of the T3 uptake methods referred to above are disclosed in the following: B. T. Eberle's U.S. Pats. 3,206,602 (1965) and 3,376,114 (1968), which utilize a polyurethane foam sponge containing an ion-exchange resin; W. di Giulio's U.S. 3,451,777 (1969) which utilizes an ion-exchange resin column.

An accurate and simplified T3 uptake test is described in the coassigned, copending application of E. L. Bettinger and J. L. Brown, Ser. No. 821,097, filed May 1, 1969, now abandoned. The key to this procedure is the use of an ion-exchange resin in the form of a solid matrix, which does not require rinsing to remove unbound T3 and is easily removed from the reaction solution to enable direct measurement of the serum's T3 binding capacity.

The Bettinger-Brown T3 uptake test directly measures the binding capacity of serum TBG for labeled T3. As previously shown in Table 1, TBPA has no affinity for T3. The binding constant of TBG for T3 is approximately 10,000 times the binding constant of albumin for this hormone, and the dilution of serum in buffer during the procedure further reduces the binding of T3 by albumin.

When serum is added to a buffer solution of labeled T3, the unoccupied TBG binding sites take up or bind the labeled T3. The excess of unbound labeled T3 is then bound to a secondary binder—in this test the ion-exchange resin strip. After removal of the strip from the buffer solution, the amount of T3 labeled TBG is measured directly and the results expressed as a thyroxine-binding capacity index (TBC Index), based on a normal T3 value of 1.00.

If the concentration of TBG (primary binders) in the serum is normal, the number of available or unoccupied binding sites for binding labeled T3 is inversely related to the number of binding sites occupied by T4 and, to a lesser degree, T3. When the availability of T4 for TBG binding is increased, as in hyperthyroidism, these binding sites are more nearly completely occupied by T4; therefore fewer binding sites are available for binding labeled T3. Thus, the activity bound to the TBG is less than in the normal T3 control serum, resulting in a decreased TBC Index. When the availability of T4 for TBG binding is decreased, as in hypothyroidism, fewer binding sites are occupied by T4, leaving more sites than normal available for binding labeled T3. The result is an increase in the amount of activity bound to the TBG and an increase in the TBC Index.

It should be noted that while, traditionally, labeled T3 is used for measuring the TBC Index, the use of labeled T4 is equally valid.

Based upon the TBC Index measurement, an indication of clinical thyroid status may be determined by checking against the ranges in Table 2.

These ranges are based upon a representative sampling of patients throughout a wide geographical area.

TABLE 2

Bettinger-Brown TBC Index Ranges

| | |
|---|---|
| Hyperthyroid | Less than 0.87. |
| Euthyroid | 0.87–1.13. |
| Hypothyroid | Greater than 1.13. |

Separation of nonhormonal from hormonal iodine by column chromatography is another variation on the PBI test. A final eluate containing only serum T4 can then be colorimetrically measured for iodine. This procedure is referred to as T4 by column. It has the advantage of selectively separating the noncalorigenic iodine-containing compounds from the thyroxine. It fails to separate, however, certain organic iodide contaminants, such as certain radiopaque gall bladder contrast media.

In 1960 a method for determination of serum thyroxine was developed by R. P. Ekins (Clin. Chim. Acta 5:453). He called the basis for this test "saturation analysis." He measured the transfer of thyroxine from a globulin to albumin after addition of labeled thyroxine. B. E. P. Murphy and C. J. Pattee (J. Clin. Endocrinol 24:187—1964) described a method of total serum thyroxine determination ("competitive protein binding analysis") similar to that of Ekins, but technically more simple and more rapid to perform. Bound thyroxine is released from the serum proteins by denaturation and precipitation with ethanol. This procedure leaves approximately 80% of the thyroxine in the alcoholic supernatant. After the supernatant is evaporated to dryness, a buffered reagent containing labeled T4, human serum and barbital is added to the extract and to a series of thyroxine standards. The unknown labeled T4 solution and thyroxine standards are passed through a column of a crosslinked dextran gel ("Sephadex G-25"). (The test was subsequently modified by replacing the gel column with an anion exchange resin.) The thyroxine concentration of the unknown samples is then compared radiometrically to the thyroxine standards. This method is further described in B. E. P. Murphy's U.S. Pat. 3,414,383 (1968).

The Murphy-Pattee method was further improved by J. L. Brown, whose coassigned, copening application (Ser. No. 865,785, filed Oct. 13, 1969, now U.S. Pat. 3,714,344, issued Jan. 30, 1973) discloses a test system that is procedurally the simplest of the competitive analysis assays.

The general theory of the Brown T4 test system is based on the fact that serum TBG has a relatively high and specific affinity for binding T4. When labeled T4 is added to a solution containing TBG (e.g., diluted pooled sera), essentially all the T4 will be bound to the TBG. If stable T4 (e.g., patient T4) is then added to this labeled T4·TBG solution, an amount of labeled T4 will be displaced from the TBG in proportion to the amount of stable T4 added. When another T4 binding agent, such as anion exchange resin is added to this system, it will bind the labeled T4 which has been displaced from the TBG. The amount of labeled T4 displacement from the TBG can then be determined by comparing the amount of radioactivity remaining in the supernatant with the original amount measured before adding the resin.

When increasing amounts of stable T4 are added to labeled T4.TBG solutions and treated as above, the activity remaining in the supernatant is found to decrease with each successive increase in added stable T4. Thus, unknown quantities of stable T4 can be determined by comparing the supernatant activity in the unknown solution to that in a similar known supernatant.

In order to adapt this procedure to serum T4 determination, the T4 must be separated from the patient's binding proteins. This is accomplished by denaturing and precipitating the proteins with alcohol. The denatured proteins release most (approximately 80 percent) of their bound T4, which can be removed in the alcoholic supernatant after centrifugation of the mixture.

The indication of clincal thyroid status, as reflected in the serum thyroxine level, may be established by reference to the suggested ranges shown in Table 3. These ranges are based upon a representative sampling of patients throughout a wide geographical area.

TABLE 3

Total Serum Thyroxine Ranges ($\mu$g. percent)

| | |
|---|---|
| Hypothyroid | Greater than 13.7. |
| Euthyroid | Less than 5.0. |
| Hyperthyroid | 5.0–13.7. |

A tendency to erroneous results under certain circumstances, attributed to catalytic decomposition of a fraction of the labeled T4 in the T4.TBG solution, was remedied by Brown and F. P. Hallett, who added a chelating agent to the solution. This is disclosed in their coassigned copending application Ser. No. 132,333, filed Apr. 8, 1971, now U.S. Pat. 3,745,211 (1973). This modification of the reagent made no change in the fundamental theory and operation of the method (hereinafter referred to as the Brown method).

Approximately 99.95% of the circulating thyroxine is bound to the plasma proteins, with 0.05% in an unbound, free state. It is currently held that the unbound or "free" thyroxine level in plasma is directly responsible for the regulation of cellular metabolism and pituitary thyrotropin (TSH) secretion. Thus, the direct measurement of free thyroxine would reflect the metabolic status of an individual more accurately than any other single thyroid function test. Heretofore, the methods available to measure free thyroxine were equilibrium dialysis, ultra-filtration, or gel filtration combined with a total serum thyroxine determination.

The equilibrium dialysis method consists of addition of tracer quantities of labeled T4 to a serum sample and dialysis through a semipermeable membrane. The labeled T4 used must be very high in purity, since only a small fraction (0.1 percent) of that added is measured. From a determination of the total serum thyroxine and the percentage of labeled T4 appearing in the dialysate, the amount of free T4 can be estimated.

Basically, the free thyroxine level is regulated by the concentration of circulating thyroxine (bound) and by the level of TBG. However, the interaction of these two factors to maintain normal levels of free thyroid hormone is considerably more complex than is suggested by that simple statement.

Under euthyroid conditions, the maintenance of a normal level of free thyroxine is by regulatory mechanisms which stimulate changes in the total thyroxine level to compensate for changes in TBG level.

An increase in the estrogen level affects the thyroid regulatory system, leading to a situation which produces distorted results with the established T3 uptake and serum T4 tests. Such increased estrogen levels commonly occur during pregnancy or during estrogen medication, for example during medication with an antiovulatory preparation which contains an estrogen.

The following sequence of events flows from an increase in the estrogen level.

(1) Elevated estrogen levels cause increased TBG formation.
(2) The resulting increased number of unsaturated thyroxine-binding sites (TBG) bind with free thyroxine, causing a lowering of the free thyroxine level.
(3) The pituitary is stimulated by the decreased free thyroxine level to secrete thyrotropic hormone (TSH).
(4) The thyroid gland, in turn, is stimulated by the TSH to secrete thyroxine.
(5) Thyroxine binds with TBG to a compensated level, causing the free thyroxine to return to a normal concentration.

When there is an elevation of estrogen level, as during pregnancy or estrogen medication, the clinical evaluation of thyroid activity obtained from T3 uptake determinations would indicate an increase in unsaturated TBG binding sites and, therefore, hypothyroidism. Conversely, T4 determinations would indicate hyperthyroidism. However, the true clincal status under these conditions, euthyroidism, is evidenced by the normal level of free thyroxine. Thus, in this case neither the T3 uptake nor the serum T4 test result alone is adequate for correct clinical assessment, even though each test result accurately reflects the value of the variable measured.

Direct "free" thyroxine determinations have not been generally adapted for routine clinical use. The techniques are difficult, involved, time consuming and require the highest purity of reagents used with great care. In spite of the difficulties of these tests, such determinations have a high degree of correlation with the metabolic status of the individual.

In 1965, F. Clark and D. B. Horn, (J. Clin. Endocrinol 25: 39–45) introduced a method for the estimation of an index which is proportional to the concentration of free T4. It is based on the determination of PBI and T3 uptake measurement.

PBI X resin T3 uptake ratio="Free Thyroxine Index."

Although Clark and Horn's "Free Thyroxine Index" provides a calculated result rather than a directly measured result, it is theoretically sound and has been shown to have a high degree of correlation with the clinical status of the patient.

There is a direct relationship between the PBI level, as used by Clark and Horn, and the serum T4 level, as determined in accordance with the Brown method referred to above.

On the other hand, the Bettinger et al. TBC Index, as calculated in accordance with the disclosure of application Ser. No. 821,097 bears an inverse relationship to Clark and Horn's T3 uptake ratio.

As a consequence of these relationships it is possible to calculate a "Free T4 Index" from data obtained by the Bettinger et al. and Brown tests according to the following formula:

$$\text{Free T4 Index} = \frac{\text{Serum T4 level (g. percent)}}{\text{TBC Index}}$$

While this "Free T4 Index" is numerically different from Clark and Horn's "Free Thyroxine Index," it is equally valid.

The indication of clincal thyroid status, as reflected by the Free T4 Index may be established by reference to the ranges shown in Table 4, which were based upon a representative sampling of patients throughout a wide geographical area.

TABLE 4

Free T4 Index Ranges

Hypothyroid _____ Less than 4.4.
Euthyroid _____ 4.4–15.7.
Hyperthyroid _____ More than 15.7.

As in the actual measurement of free T4, the "Free T4 Index" is insensitive to the administration of estrogens, androgens, salicylates, diphenylhydantoin, conditions of pregnancy or nephrosis and other factors causing anomalous results due to variations in the level of TBG or to interference with its normal binding.

The measurement of a single variable is usually not sufficient to provide an accurate diagnosis of thyroid status. Prior to the present invention, the experimentally determined free T4 value or the calculated Free T4 Index came closest to providing the most reliable information with the fewest number of tests for assessment of thyroid function.

The effects of various physiological conditions and drugs on the T3 TBC Index and T3 TBC Index tests and on the Free T4 Index may be summarized as follows:

TABLE 5

|  | T4 | T3 TBC Index | FT4 Index | Normal value |
|---|---|---|---|---|
| T3 TBC Index | | | | 0.87–1.13 |
| T4 μg. percent | | | | 5.0–13.7 |
| Free T4 Index | | | | 4.4–15.7 |
| Pregnancy/estrogen medication | Increased | Increased | Normal | |
| Hypo-pregnancy | Decreased | do | Decreased | |
| Hyper-pregnancy | Increased | Decreased | Increased | |
| Nephrosis | Decreased | do | Normal | |
| Androgen medication | do | do | do | |
| Diphenylhydantoin | do | do | do | |
| Hypothyroidism—Treated: | | | | |
| Adequate T3 medication | No effect | No effect | No effect | |
| Adequate desiccated thyroid | Normal | Increased | High-normal | |
| Adequate L-thyroxine | High-normal | do | do | |
| Hyperthyroidism—Treated with adequate control | Normal | Normal | Normal | |
| Acromegaly | Decreased | Decreased | do | |

SUMMARY OF THE INVENTION

It is an object of the present invention to provide an improvement in in vitro tests for the assay of hormones, antigens, steroids, etc. in body fluids. It is a further object to provide such an improvement with particular respect to thyroid function testing which simultaneously takes into account both the serum thyroxine level and the level of saturation of thyroxin-binding globulin. It is still another object to provide a method for the direct determination of the effective thyroxine ratio which is a free thyroxine index and to make possible the accurate assessment of thyroid function status, by a single simple test, in the presence of distorting influences, such as elevated estrogen levels. Other objects will be in part apparent and in part pointed out hereinafter.

The present invention is thus directed to an improved method for use in clinical competitive-binding tests and, in one embodiment, is directed to a method for determining the effective thyroxine ratio of a blood sample as an index of the relative free thyroxine level thereof which involves the steps of mixing with a labeled reagent (a) thyroxine from the blood sample to be tested and being substantially free of thyroxine-binding globulin and (b) a solution containing unsaturated thyroxine-binding globulin and its associated thyroid hormones from a blood sample from the same source, the labeled reagent being a solution of a labeled thyroid hormone selected from the group consisting of thyroxine and 3,3',5'-triiodothyronine, whereby a portion of the labeled thyroid hormone is bound to unsaturated thyroxine-binding globulin from the solution, and thereafter measuring one of (1) the labeled thyroid hormone bound to the thyroxine-binding globulin and (2) the unbound labeled thyroid hormone. In the preferred embodiment, the labeled reagent is a solution of labeled thyroxine bound to thyroxine-binding globulin.

DESCRIPTION OF THE PREFERRED EMBODIMENTS

In accordance with the invention, the above and other objects are accomplished by modifying the known competitive-binding methods of assay. For example, in one embodiment of the invention, the effective thyroxine ratio of the blood is estimated by a modification of the above-mentioned Brown method for serum thyroxine, wherein two solutions derived from the blood being tested are added to the labeled T4.TBG reagent. The first such solution is, as described by Brown, a solution containing about 80% of the T4 from a serum sample, free of the blood proteins.

The second solution, in accordance with the present invention, contains a predetermined amount of the serum being tested. In accordance with the prior art, T4 binding by albumin is greatly reduced by dilution, and binding by prealbumin is inhibited by barbital buffer, thereby providing a solution in which the only effective T4 binding protein is unsaturated TBG from the serum being tested.

Basically, the new method for determining the effective thyroxine ratio is a combination of the classical T3 uptake and serum T4 test methods but which can be conducted in a single container. The underlying concept will be more readily understood from the following.

It will be recalled that in the T3 uptake test the thydroxine binding protein sites not occupied by T3 or T4 will take up labeled T3. In the serum T4 method, the total serum T4 is extracted and is caused to displace labeled T4 from labeled T4.TBG. The displaced labeled T4 is removed and the remaining labeled T4.TBG is counted. Table 6 indicates in relative terms the status of the pertinent serum components and the T3 uptake and serum T4 test results in various clinical situations.

TABLE 6

| 1 | 2 | 3 | 4 | 5 | 6 | 7 |
|---|---|---|---|---|---|---|
| Clinical situation | Level of T4 binding proteins | Level of bound T4 | Level of free T4 | T3 uptake test (cpm.) | Serum T4 test (cpm.) | Free T4 index (cpm.) (5+6) |
| Euthyroid | Normal | Normal | Normal | Moderate (10,000) | Moderate (10,000) | 20,000 |
| Hypothyroid | do | Low | Low | High (15,000) | High (15,000) | 30,000 |
| Hyperthyroid | do | High | High | Low (5,000) | Low (5,000) | 10,000 |
| Elevated estrogen level | High | do | Normal | High (15,000) | do | 20,000 |

Note.—Cpm.=counts per minute.

It will be noted from the table that in the presence of uncomplicated thyroid disease the count rate in both the T3 uptake and the serum T4 tests depart from the normal in the same direction, i.e., hypothyroid serum gives high counts in both tests and hyperthyroid serum gives low counts in both cases. Thus the combined counts in the two tests emphasize the existence of an abnormal situation with respect to thyroid function.

On the other hand, the distorting influence of elevated estrogen levels causes the count rates in the two tests to depart from the normal in opposite directions. Their departures from normal values tend to offset each other, their sum, therefore, indicating a normal situation with respect to thyroid function.

The calculated Free Thyroxine Index originated by Clark and Horn, and variants thereof, are based on the same concept. Only the arithmetic differs.

The present invention permits the effective thyroxine ratio as an index of the relative free thyroxine level of a sample of blood serum (or plasma) to be determined in a single in vitro test carried out in a simple uncompartmented vial. This will be more clearly evident from the following description.

In the first step of the present method, the T4 (approximately 80%) is extracted from a serum sample and an aliquot of the extract is added to a labeled T4.TBG reagent solution. The T4 in the extract partially displaces labeled T4 from the labeled T4.TBG reagent, the extent of displacement being proportional to the level of T4 in the serum sample.

In the second step an aliquot of the same serum is added to the same vial. The displaced labeled T4 from Step 1 is now partially taken up by the unsaturated TBG present in the serum aliquot added in Step 2, the extent of labeled T4 uptake being dependent upon two factors: (1) the amount of labeled T4 available (from Step 1); (2) the amount of unsaturated TBG present in the serum aliquot added (in Step 2).

It will be understood that the order or sequence of these steps is not critical and that the invention may be carried out by reversing the steps or order of addition of the T4 extract and patient serum containing the unsaturated TBG. Also, the labeled reagent employed may be a barbital-buffered solution of labeled T4 with substantially no TBG or it may contain labeled T3 in lieu of labeled T4.

It has been pointed out previously that labeled T3 has traditionally been used in determining the unsaturated binding capacity of serum proteins for thyroid hormones but that labeled T4 may be substituted with equal validity. In the present process, this substitution is made, the labeled T4 being provided by displacement from labeled T4.TBG in Step 1.

It will be evident that the relative amounts of serum T4 and unsaturated serum proteins provided in the two steps of the test method of the invention will be dependent upon the relative volumes of serum represented by the two aliquots used. Meaningful results are obtainable using any fixed ratio of serum aliquots within a rather wide range. However, it has been found experimentally that a system of optimum utility is obtained when a fixed ratio, $A/B$, of approximately 21 is used, wherein A is the volume of serum represented by the aliquot supplying the T4 and B is the volume of serum represented by the aliquot supplying the unsaturated TBG. As stated, this ratio may vary widely and may range, for example, between approximately 10:1 and 30:1.

It will be understood that the terms "labeled T4" and "labeled T3," as employed herein, are intended to designate either of these hormones in a form in which they have been rendered identifiable by associating therewith or incorporating thereinto a quantity of distinctive atoms. The distinctive atoms may be, for example, atoms of a radionuclide, identifiable and measurable through their radioactivity; atoms of a stable nuclide of distinctive atomic weight not normally present, such as C–13, identifiable by mass spectroscopy, etc.; or atoms of a different element that is chemically similar to an element normally present in the hormone.

Through the practice of the present invention, it is now possible to make a direct determination of the effective thyroxine ratio, an accurate assessment of thyroid function status, in the presence of distorting influence such as elevated estrogen levels. In this regard, the test method of the invention provides accurate and reliable results when conducted on blood samples from very ill patients and patients with no TBG in their blood whereas the standard T3 and T4 tests yield misleading results in such instances. The test method of the invention provides the same results as prior art tests, however, in the case of patients suffering from T3 thyrotoxicosis (toxic hyperthyroidism due to elevated T3 levels), i.e., all tests show such patients to be euthyroid.

The test method of the invention is also useful for the determination of other ligands or physiologically active substances in body fluids, such as steroids, antigens, antibodies and iron, which are capable of existing in bound and unbound forms. The binder in such systems is a substance, normally a protein, which has an affinity for at least one such ligand or physiologically active substance and thus leads to the formation of a ligand-binder complex. For example, the present test method may be applied to the determination of steroids such as plasma cortisol or to the determination of plasma iron. Thus, the corticosteroid cortisol, one of the most important steroid hormones secreted by the adrenal cortex, is bound to a protein carrier, corticosteroid binding globulin (CBG) or transcortin. Similarly, plasma iron is transported by transferrin (ion-binding globulin) which behaves as a beta globulin. Duing pregnancy, for example, the levels of corticosteroid binding globulin and transferrin may increase.

The invention is further illustrated by the following.

Labeled T4.TBG Reagent

This reagent is a buffered dilution of pooled normal serum containing barbital and thyroxine labeled with I–125. Its preparation is described in the coassigned, copending application of J. L. Brown and F. P. Hallett, Ser. No. 132,333, filed Apr. 8, 1971, now U.S. Pat. 3,745,211, as follows:

"To 78 ml. of serum is added 1850 ml. of a pH 8.6 barbital buffer solution containing 2.39% sodium barbital and 0.7% sodium azide (microbiological preservative), pH adjusted with HCl. A small amount of radioactive T–4 (approximately 0.13 mc.) is also added to serve as a tracer for determining the efficiency of the extraction.

"An extraction column is prepared by adding a sufficient amount of an ion-exchange resin to a suitable glass column to provide a bed volume of 1,000 ml. and a flow rate of approximately 10 ml. per minute. For this purpose, a strongly basic quaternary ammonium type resin is suitable. For example, a commercially available resin of this kind designated 'Amberlite IRA–400' (manufactured by the Rohm and Haas Company) is satisfactory, but other anion-selective or cation-selective resins may be used instead.

"The resin is added to the column as a water slurry and a layer of water is always maintained above the resin. The column is connected to a reservoir containing the serum solution to be extracted, and flow of the serum through the column is begun. Periodically a 1 ml. sample of the eluate is removed and its radioactivity counted to measure the efficiency of the extraction. The radioactivity of the eluate should be 10% or less than that of the stock solution.

"To approximately 8 ml. of the above barbital buffer add sufficient (0.215 gm. EDTA-Na$_2$) disodium EDTA to provide a concentration of 0.1 mg. disodium EDTA per ml. of column eluate (extracted serum solution). Dissolution of the EDTA is effected with the aid of low heat. After cooling to room temperature, this solution is added to the column eluate (extracted serum solution). More radioactive thyroxine (approximately 0.27 mc.) is then added to the eluate. The extracted serum solution is then preferably passed through a 0.22 filter.

"At this point, a volume (11,580 ml.) of barbital buffer solution containing 0.1 mg. disodium EDTA per ml. equal to 6 times the volume of the eluate is measured out. This solution is then added to the eluate providing a 6-fold dilution of the eluate. The resulting reagent has a pH of approximately 8.6 and a disodium EDTA concentration of 0.1 mg./ml."

Serum T4 Solution

About 10 ml. of the blood to be tested is withdrawn and allowed to coagulate. The serum is removed and a 1.0 ml. portion of the serum is added dropwise to 2 ml. of 95% ethanol in a centrifuge tube. The contents are well mixed on a high speed mixer to denature the serum proteins. This alcoholic mixture is then centrifuged until the precipitated protein is packed in the bottom of the tube (2000–2500 r.p.m. for 4–5 minutes). The resulting protein-free supernatant alcoholic solution contains approximately 80% of the total thyroxine content of the sample.

Serum TBG Solution

A portion of the serum to be tested (0.20 ml.) is added to 4.0 ml. of pH 8.6 barbital buffer (prepared as described under labeled T4.TBG Reagent). This solution supplies unsaturated TBG from the serum under test. A plain water solution may be used in lieu of a buffered solution and smaller amounts of serum, such as 5 or 10µl., may be employed.

Test

Note: For each set of test sera, a control serum is processed in exactly the same manner as the test sera, including the preparation of (control) Serum T4 and TBG solutions. The control serum is a commercially available pooled normal serum containing normal T4 and TBG levels.

An aliquot of Serum T4 solution (0.30 ml.) is added to 4.0 ml. of the labeled T4.TBG Reagent in a vial. The vial is stoppered and the solutions are well mixed. Then an aliquot (0.10 ml.) of serum TBG solution is added to the Reagent/T4 solution mixture.

A strip of ion-exchange resin membrane is added to the vial containing the mixture of the three solutions. A preferred resin membrane is the anion-selective resin designated "AR-111," manufactured by Ionics, Inc., Watertown, Mass.

After addition of the resin strips, the vials containing the mixtures and control sera are capped and rotated for exactly one hour at room temperature. A commercial rotator designed for the purpose may be used conveniently. Since the resin uptake of radioactive thyroxine is a function of rotation time, it is essential that the rotation time to the same for test and control samples. At the end of the one hour rotation time, the resin strip is removed with forceps and discarded.

The concentration of labeled thyroxine is then determined by means of a counter. A minimum of 10,000 counts are then collected for each vial. An index which is designated the Effective Thyroxine Ratio is then calculated as follows:

$$\frac{\text{Counts/min. for Control Serum} - \text{Background}}{\text{Counts/min. for Test Serum} - \text{Background}} = \text{Effective Thyroxine Ratio}$$

Results

The thyroid hormone status of serum samples from 209 patients was appraised by means of the previously described Bettinger et al. T3 uptake and Brown serum T4 tests as well as by the Effective Thyroxine Ratio method described above. A Free T4 Index was also calculated from the results of the conventional assays. In addition, the thyroid function status of each patient was evaluated clinically.

The total population of patients in the study was divided into five subgroups on the basis of history clinical observation and test results:

(1) Uncomplicated euthyroid (128)
(2) Uncomplicated hypothyroid (9)
(3) Uncomplicated hyperthyroid (14)
(4) Pregnant euthyroid (37)
(5) Euthyroid receiving estrogen medication (21):
Total 209

The results may be summarized as follows:

In the group of 128 uncomplicated euthyroid patients, all tests and the Free T4 Index showed the patients to be euthyroid with the exception that four patients were found to be hypothyroid by the serum T4 test and 2 were found to be hypothyroid by the Free T4 Index.

In the group of 9 uncomplicated hypothyroid patients, all tests and the Free T4 Index showed the patients to be hypothyroid with the exception that one patient was found to be euthyroid by the T3 uptake test.

In the group of 14 uncomplicated hyperthyroid patients, all tests and the Free T4 Index showed the patients to be hyperthyroid with the exception that one patient was found to be euthyroid by the T3 uptake test, two patients were found to be euthyroid by the T4 test and two patients were found to be euthyroid by the Free T4 Index.

In the group of 37 pregnant euthyroid patients, only one patient was found to be euthyroid by the T3 uptake test while all of the remaining patients were found to be hypothyroid by this test. Four of the 37 patients were found to be hyperthyroid by the T4 test while the serum T4 levels of the remaining 33 patients were elevated in most cases but within the euthyroid range for the test. All 37 patients were found to be euthyroid by the Free T4 Index and by the Effective Thyroxine Ratio of this invention.

In the group of 21 euthyroid patients receiving estrogen medication, only three were found to be euthyroid by the T3 uptake test while the remaining 18 were all found to be hypothyroid by this test. Three of the 21 patients were found to be hyperthyroid by the T4 test while the serum T4 levels of the remaining 18 patients were elevated in most cases but within the euthyroid range for the test. All 21 patients were found to be euthyroid by the Free T4 Index and by the Effective Thyroxine Ratio of this invention.

In accordance with the invention, the indication of clinical thyroid status, as reflected by the Effective Thyroxine Ratio, may be established by reference to the ranges shown in Table 7.

TABLE 7

Effective Thyroxine Ratio Ranges

Hyperthyroid _____ Less than 0.85.
Euthyroid _____ 0.85–1.15.
Hypothyroid _____ More than 1.15.

In view of the above, it will be seen that the several objects of the invention are achieved and other advantageous results attained.

As various changes could be made in the above methods without departing from the scope of the invention, it is intended that all matter contained in the above description shall be interpreted as illustrative and not in a limiting sense.

What is claimed is:

1. A method for determining the effective thyroxine ratio of a blood sample as an index of the relative free thyroxine level thereof which comprises the steps of mixing with a labeled reagent (a) thyroxine from the blood sample to be tested and being substantially free of thyroxine-binding globulin and (b) a solution containing unsaturated thyroxine-binding globulin and its associated thyroid hormones from a blood sample from the same source, said labeled reagent being a solution of a labeled thyroid hormone selected from the group consisting of thyroxine and 3,3',5'-triiodothyronine, whereby a portion of the labeled thyroid hormone is bound to unsaturated thyroxine-binding globulin from said solution; and thereafter measuring one of (1) the labeled thyroid hormone bound to the thyroxine-binding globulin and (2) the unbound labeled thyroid hormone.

2. A method according to claim 1 wherein said labeled reagent comprises a solution of labeled thyroxine bound to thyroxine-binding globulin.

3. A method according to claim 1 wherein said labeled reagent comprises a buffered solution of radioactive thyroxine and blood serum from which most of the naturally occurring thyroxine has been extracted.

4. A method according to claim 1 wherein the thyroid hormone in said labeled reagent contains radioactive iodine selected from the group consisting of iodine-125 and iodine-131.

5. A method according to claim 1 wherein said thyroxine from the blood sample to be tested is present in the form of a solution and the ratio of the volume of blood serum represented by said solution and the volume of blood serum represented by the solution containing unsaturated thyroxine-binding globulin is between approximately 10:1 and approximately 30:1.

6. A method according to claim 5 wherein said ratio is approximately 21:1.

References Cited

UNITED STATES PATENTS

| | | | |
|---|---|---|---|
| 3,414,383 | 12/1968 | Murphy | 23—230 B |
| 3,516,794 | 6/1970 | Murty et al. | 23—230 B |
| 3,615,222 | 10/1971 | Mead | 23—230 B |
| 3,659,104 | 4/1972 | Gross et al. | 23—230 BX |

JOSEPH SCOVRONEK, Primary Examiner

U.S. Cl. X.R.

250—83 SA; 424—1

PO-1050
(5/69)

UNITED STATES PATENT OFFICE
CERTIFICATE OF CORRECTION

Patent No. 3,799,740                Dated  March 26, 1974

Inventor(s)  Everett K. Mincey

It is certified that error appears in the above-identified patent and that said Letters Patent are hereby corrected as shown below:

Column 1, line 65, "1.8%" should read -- 1.8g% --. Column 4, lines 67-68, "assays. assays." should read -- assays. --. Column 5, line 32, "Hypothyroid --- Greater than 13.7." should read -- Hypothyroid --- Less than 5.0 µg%. --; line 33, "Euthyroid --- Less than 5.0." should read -- Euthyroid --- 5.0 - 13.7 µg%. --; line 34, "Hyperthyroid --- 5.0 - 13.7." should read -- Hyperthyroid --- Greater than 13.7 µg%. --. Column 7, line 22, "and T3 TBC Index tests and" should read -- and T4 tests and --. Column 8, line 57, "thydroxine" should read -- thyroxine --. Column 10, line 35, "Duing" should read -- During --. Column 11, line 58, "to the same" should read -- be the same --.

Signed and sealed this 12th day of November 1974.

(SEAL)
Attest:

McCOY M. GIBSON JR.                C. MARSHALL DANN
Attesting Officer                  Commissioner of Patents